(12) United States Patent
Cabrera

(10) Patent No.: US 10,376,935 B1
(45) Date of Patent: Aug. 13, 2019

(54) AUTOMATED BIN WASHER

(71) Applicant: GROWERS CUSTOM EQUIPMENT, LLC, Salinas, CA (US)

(72) Inventor: Jorge Cabrera, Yuma, AZ (US)

(*) Notice: Subject to any disclaimer, the term of this patent is extended or adjusted under 35 U.S.C. 154(b) by 112 days.

(21) Appl. No.: 15/699,929

(22) Filed: Sep. 8, 2017

Related U.S. Application Data

(60) Provisional application No. 62/385,468, filed on Sep. 9, 2016.

(51) Int. Cl.
| | |
|---|---|
| B08B 9/44 | (2006.01) |
| B08B 9/20 | (2006.01) |
| B08B 9/30 | (2006.01) |
| B08B 9/34 | (2006.01) |
| B08B 3/14 | (2006.01) |
| B65G 47/42 | (2006.01) |
| B08B 3/08 | (2006.01) |

(Continued)

(52) U.S. Cl.
CPC ............... *B08B 9/44* (2013.01); *B08B 9/205* (2013.01); *B08B 9/30* (2013.01); *B08B 9/34* (2013.01); *B08B 3/08* (2013.01); *B08B 3/14* (2013.01); *B08B 9/00* (2013.01); *B08B 9/027* (2013.01); *B08B 9/0321* (2013.01); *B08B 9/0804* (2013.01); *B08B 9/0813* (2013.01); *B08B 9/0821* (2013.01); *B08B 9/0826* (2013.01); *B08B 9/093* (2013.01); *B08B 9/20* (2013.01); *B08B 9/28* (2013.01); *B08B 9/32* (2013.01); *B65G 15/00* (2013.01); *B65G 47/42* (2013.01); *B65G 2201/0235* (2013.01)

(58) Field of Classification Search
CPC .. B08B 9/00; B08B 9/027; B08B 9/32; B08B 9/0321; B08B 9/093; B08B 9/20; B08B 9/205; B08B 9/28; B08B 9/30; B08B 9/42; B08B 9/44; B08B 9/0804; B08B 9/0813; B08B 9/0821; B08B 9/0826; B08B 9/34; B08B 3/08; B08B 3/14; B65G 15/00; B65G 47/42; B65G 2201/0235

See application file for complete search history.

(56) References Cited

U.S. PATENT DOCUMENTS

| | | | | |
|---|---|---|---|---|
| 4,104,080 A | * | 8/1978 | Sadwith | ............... B08B 9/0821 134/152 |
| 5,622,196 A | * | 4/1997 | Luongo | ................... B08B 3/022 134/131 |

(Continued)

*Primary Examiner* — Sharidan Carrillo
(74) *Attorney, Agent, or Firm* — JRG Attorneys at Law

(57) ABSTRACT

An automated system and method for washing bins. The system includes an infeed conveyor zone having a first conveyor platform for transporting the bins in a conveying direction. The system also includes a bin rotator disposed next to the infeed conveyor zone and rotates upward to allow the bins to be flipped and then loaded onto the first conveyor platform. The system further includes a bin washer zone located downstream from the infeed conveyor zone and having a second conveyor platform for receiving and transporting the bins in the conveying direction. The bin washer zone has sprayers for washing and sanitizing the bins with pressurized liquid. A flipping zone is located downstream from the bin washer zone for allowing the bins to be flipped and transferred onto an outfeed zone that allows the bins to be transported into a loading position at the end of the outfeed zone for reuse.

5 Claims, 16 Drawing Sheets

(51) Int. Cl.
*B65G 15/00* (2006.01)
*B08B 9/08* (2006.01)
*B08B 9/032* (2006.01)
*B08B 9/093* (2006.01)
*B08B 9/32* (2006.01)
*B08B 9/00* (2006.01)
*B08B 9/28* (2006.01)
*B08B 9/027* (2006.01)

(56) References Cited

U.S. PATENT DOCUMENTS

2008/0105474 A1* 5/2008 Byers .................... B08B 9/0936
                                                                                  180/53.8
2012/0048301 A1* 3/2012 Beard ....................... B08B 9/28
                                                                                  134/10

* cited by examiner

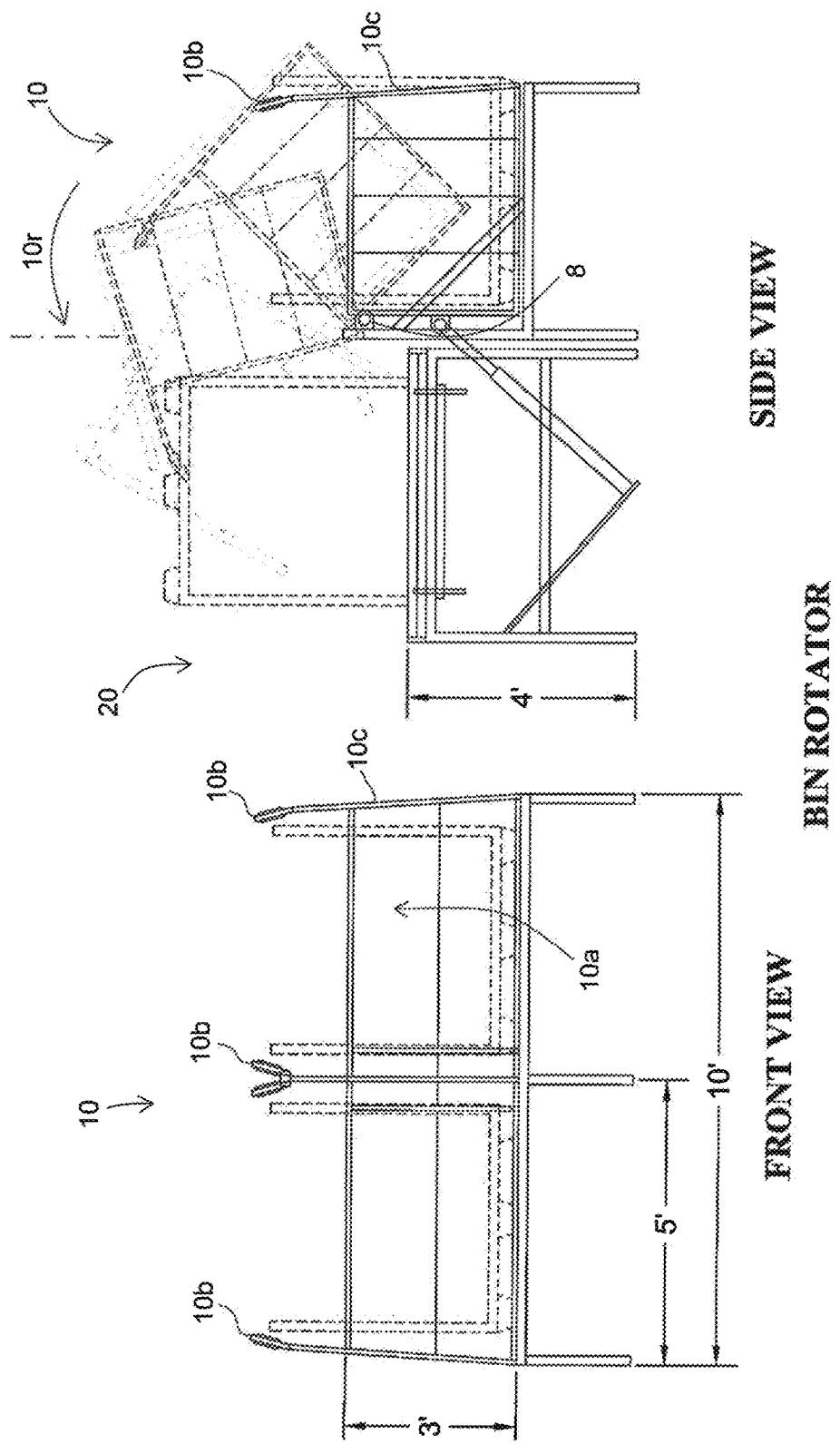

BIN ROTATOR

TOP VIEW

FRONT VIEW

AUTOMATED BIN WASHER

PRIORITY CLAIM

This non-provisional application claims priority to Provisional Patent Application Ser. No. 62/385,468, entitled "Automated Bin Washer", filed on Sep. 9, 2016.

TECHNICAL FIELD

The present invention relates generally to a washing device, and more specifically, to a method and an automated system for washing and sanitizing bins.

BACKGROUND OF THE INVENTION

Invariably, there are problems associated with effectively washing bins especially if they have been used to store or transport such things as produce or various items that can dirty the interior or exterior of the bins. In general, bins are hard to wash due to their size, weight and elongated shape which hampers free and full access to the interior of the bin during cleaning. Also, bins are hard to wash since the washing process is usually not efficient because it involves manual labor that is very intense. For instance, if bins are used to store or transport produce or other items, they must be manually washed with a pressurized water hose and/or with brushes in order to remove plant residue, mold, decayed material, dirt, leaves, grime, twigs and the like.

Another problem associated with washing bins is the draining of the cleaning fluid used to wash them. Often this will involve moving and turning the bin onto its side or inverting the bin. This increases the time required to effectively clean a bin and consequently where it is necessary to clean a large number of bins, the process becomes increasingly more difficult and time consuming. Importantly, the manual labor required to clean the bins can lead to safety issues such as workers being injured while bending over to wash the bins or turning them over on their side for further washing and sterilizing.

A further problem associated with manually washing bins is the high volume of water that goes to waste due to the use of pressurized water hoses and/or washers. This makes the process of cleaning them very costly, with low output since three workers are typically required to clean 100 bins in a 10-hour work shift.

In light of the shortcomings in the prior art, there exists a need for an improved way of washing bins, such as an apparatus and system, that can effectively remove dirt, plant residue, mold, decayed material, or dried produce from all surfaces, both interior and exterior, of the bins and effectively kill pathogens, and that can eliminate the need for manual labor, thus reducing labor expenses and safety issues related to the manual labor.

SUMMARY OF THE INVENTION

The present invention is a new method and system for washing bins.

One aspect of the present invention is to provide an automated bin washer that reduces the need for manual labor.

Another aspect of the present invention is to advantageously provide a method and an automated system for washing bins that is more productive and efficient than the current way of washing them as described above.

The present invention also provides a method and an automated system that is configured to substantially reduce manual labor since the bins are handled and/or moved by a forklift and then loaded and moved by the automated system.

The present invention additionally provides a method and system that reduces up to 95% of the amount of water wasted when washing and sanitizing the bins since the automated system uses at least one filter to recycle the water used for cleaning and sterilizing the bins.

The present invention further provides a method and system that is configured to use highly-pressurized water for removing dirt, plant residue, mold, decayed material, leaves, grime, twigs and the like from the bins.

The present invention also includes a system and method that is highly adaptive in that it is able kill bacteria by the injection of chlorine in the water which may include a metering device for achieving the objective. As a result, the bins are properly sanitized in compliance with standards, rules, or laws imposed by states or the federal government.

In an alternative embodiment of the present invention, the system and method is able to kill bacteria by the injection of chlorine dioxide and/or parasitic acid in the water.

It is another feature of the present invention to provide an automated bin washer that operates on its own once activated and one forklift driver for moving the bins to and from the automated bin washer. Further, the bin washer is configured to be set up with sensors and safety mechanisms on the rotator side for automatic rotating of the bins.

It is a further feature of the present invention to provide a suitably configured automated system that is able to clean up to approximately 200 bins an hour. Accordingly, the total bins washed in 8 hours with one worker operating the automated system would equal approximately 1,600 bins cleaned and sanitized in one work shift.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 2A is a front and side perspective view of the bin rotator zone.

DETAILED DESCRIPTION OF THE INVENTION

Introduction

Figure 1A:
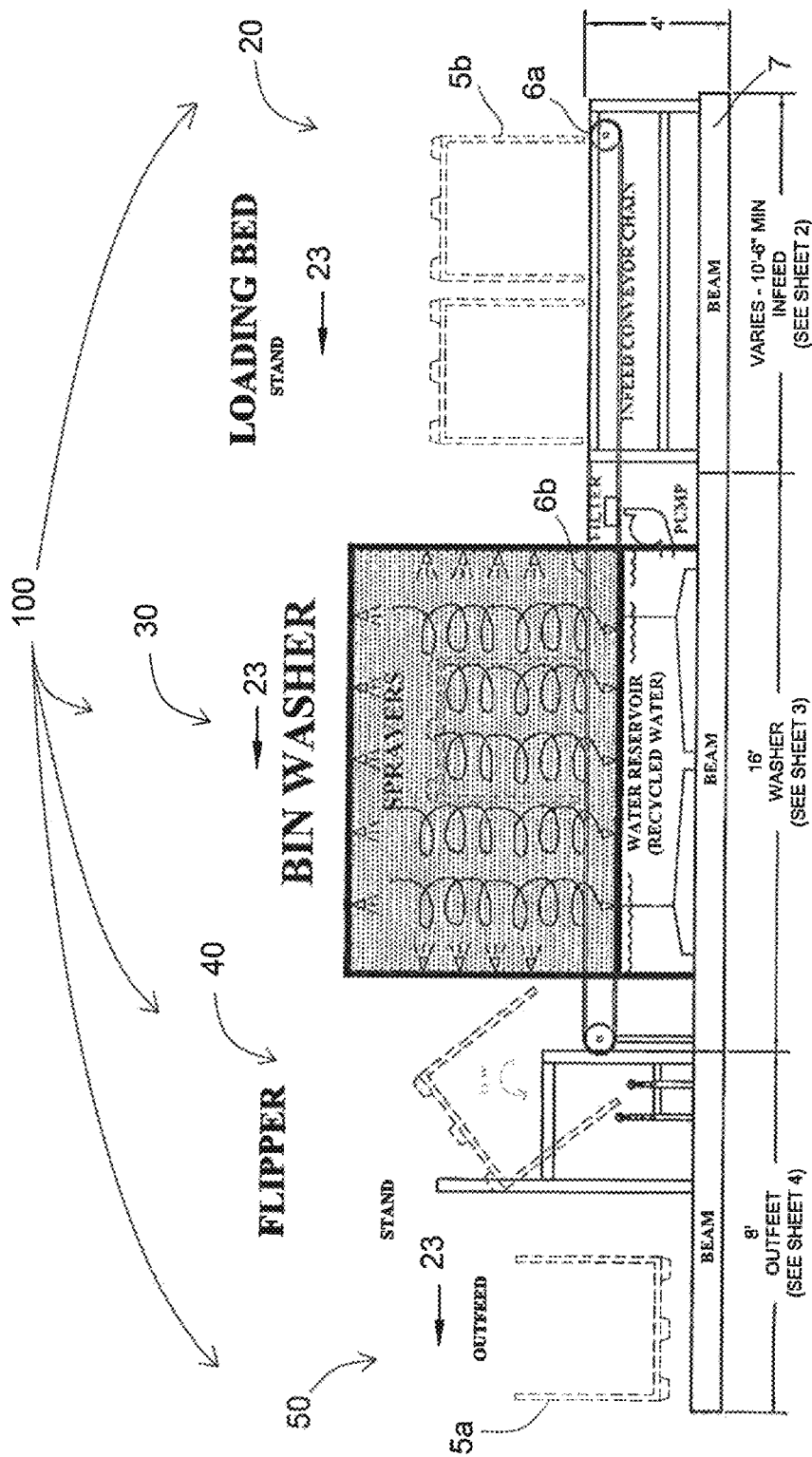
FIGS. 1A and 1B are side perspective views of the automated bin washer.

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

One embodiment of the present invention includes a new automated system having a bin rotator configured to receive bins, the bin rotator is disposed perpendicular, adjacent or next to an infeed conveyor zone, the infeed conveyor zone includes a first conveyor platform for transporting the bins in a conveying direction, the bin rotator is also configured to rotate upward relative to the ground at a predetermined angle of rotation, thereby enabling the bins to be flipped and then loaded onto the first conveyor belt at a first predetermined position wherein the interior of the bins face downwards.

Another embodiment of the present invention advantageously includes a bin washer zone located downstream from the infeed conveyor zone and having a second conveyor platform for receiving and transporting the bins in the conveying direction. The bin washer zone also has a plurality of sprayers for beneficially washing and sanitizing the bins with pressurized liquid. The bin washer is disposed at a predetermined vertical height directly above a bin rotator zone for allowing the bins to freely descend downward at a predetermined angle from the bin washer to the bin rotator zone.

The bin flipping zone is also located downstream from the bin washer zone. The bin washer zone includes a first roller-bar and a second roller-bar. The first miler-bar has a predetermined vertical height configured to be lower than a predetermined vertical height of the second roller-bar to allow the descending bins to collide with the first roller-bar and then collide with the second roller-bar for flipping and transferring the bin via the gravitational energy onto an outfeed zone at the first predetermined position.

The outfeed zone is located downstream from the bin rotator zone and is defined by a plurality of rollers arranged in longitudinal columns and configured to spin via gravitational energy, the outfeed zone is disposed at a predetermined angle directly above the ground to allow the bins to be transported by gravitational and kinetic energy in the conveying direction, thereby allowing the bins to be transported into a loading position at the end of the outfeed zone with the forklift access side of the bins facing downward (i.e., the bins being positioned in the first predetermined position).

An alternative embodiment of the present invention provides a new method of washing and sanitizing bins. The method includes the steps of receiving a plurality of bins on a loading bed; rotating the loading bed upward relative to the ground at a predetermined angle of rotation to allow the bins to slide off the loading bed for allowing said bins to be loaded onto a first conveyor belt disposed in an infeed conveyor zone, the bins are loaded on the first conveyor belt at a predetermined position.

The method also includes the steps of transporting the bins disposed on the first conveyor belt in a conveying direction; receiving and transferring the bins onto a second conveyor belt, the second conveyor belt being disposed in a bin washer zone for allowing the bins to be washed and sanitized with pressurized liquid flowing from a plurality of sprayers, the bins being received and transported in the conveying direction.

The method further includes the steps of flipping and transferring the bins into an outfeed zone at a predetermined position therein, the outfeed zone being defined by a plurality of rollers arranged in longitudinal columns, the outfeed zone is also disposed at a predetermined angle directly above the ground for allowing the bins to be transported by gravitational and kinetic energy in the conveying direction, thereby enabling the bins to be transported into a loading position at the end of the outfeed zone.

DETAILED DESCRIPTION

It should be understood that the foregoing relates to various embodiments of the present invention which can be carried out independently and/or in combination and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

Figure 1B:
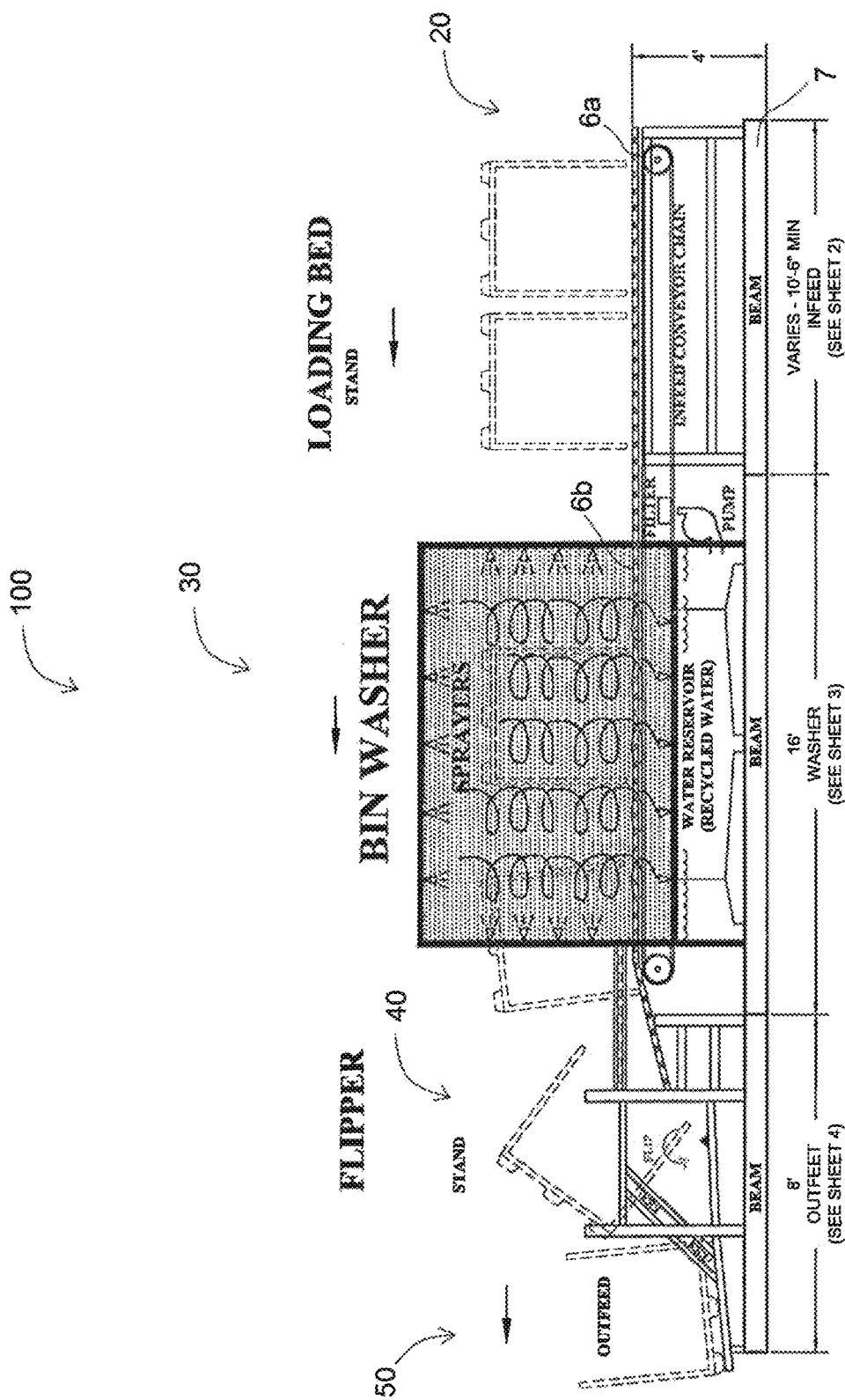
Figure 1C:
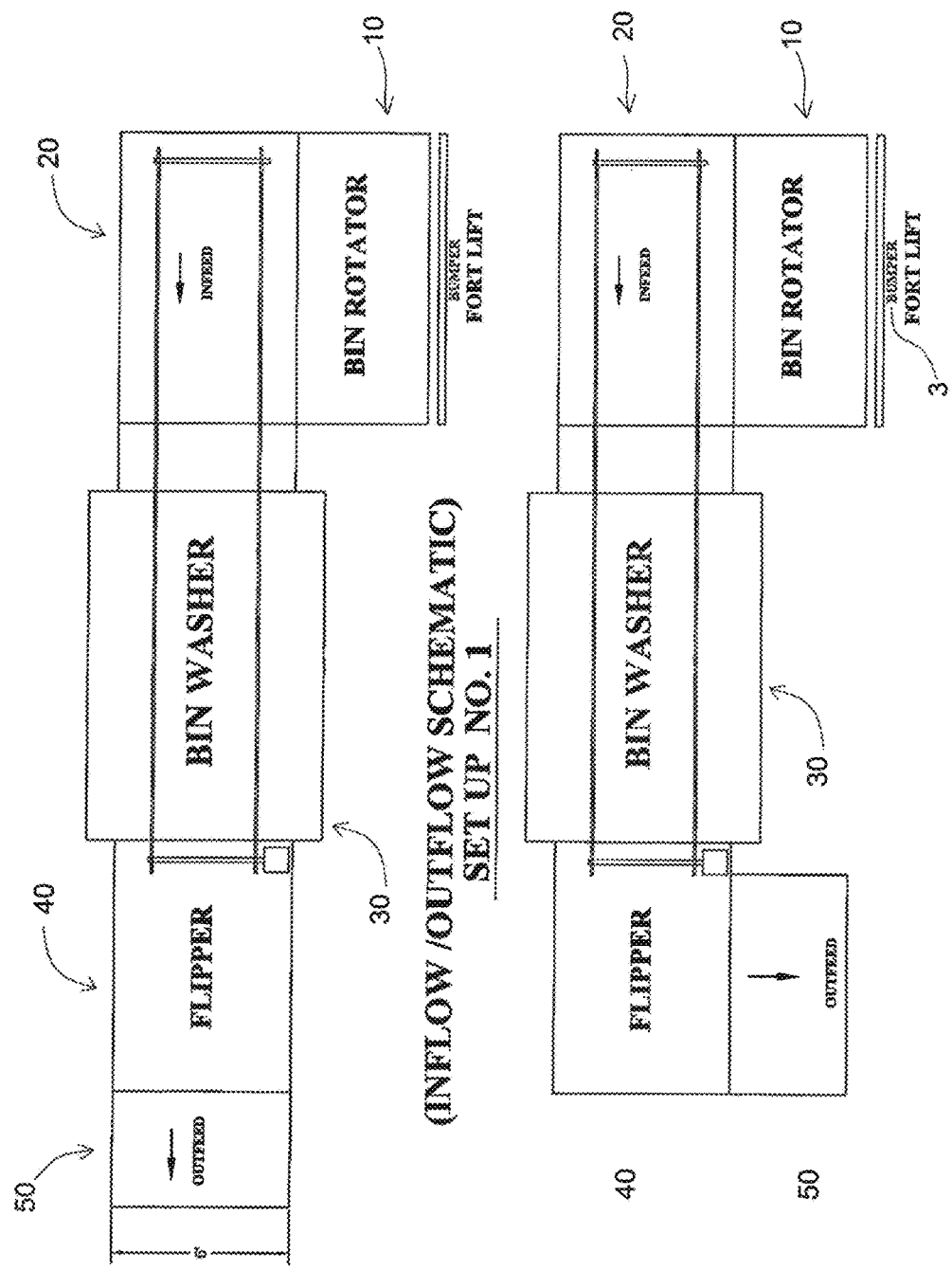
FIGS. 1C and 1D are top views of the automated bin washer.

The present invention is an automated system 100 used for washing and sanitizing bins. As shown in FIGS. 1A, 1B and 1C, the automated system 100 includes a bin rotator 10, an infeed conveyor zone 20, a bin washer zone 30, a bin flipping zone 40 and an outfeed zone 50. In one embodiment, the automated system 100 is configured to be positioned on a platform such as a beam 7. In use, a forklift driver loads at least one bin on the bin rotator 10. The bin rotator 10 is configured to rotate upward to allow the bin to be flipped and then loaded onto a first conveyor platform 6a that is located in the infeed conveyor zone 20. The first conveyor platform 6a is configured to transport the bins in a conveying direction 23.

Referring still to FIGS. 1A, 1B, and 1C, the bin washer zone 30 receives and transports the bins on a second conveyor platform 6b traversing in the conveying direction 23 and also includes sprayers 33 for washing and sanitizing the bins. The flipping zone 40 is configured to receive and flip the bins into the outfeed zone 50. Once the clean bins are loaded at the end of the outfeed zone 50, they are picked up by a forklift driver for reuse.

In one embodiment, the first and second conveyor platforms 6a/6b are a conveyor chain or belt 6a/6b that is suitably configured to transport the bins in the conveying direction 23 as shown in FIGS. 1A, 1B, 3A, 3B, 4A, and 6A.

Figure 7:
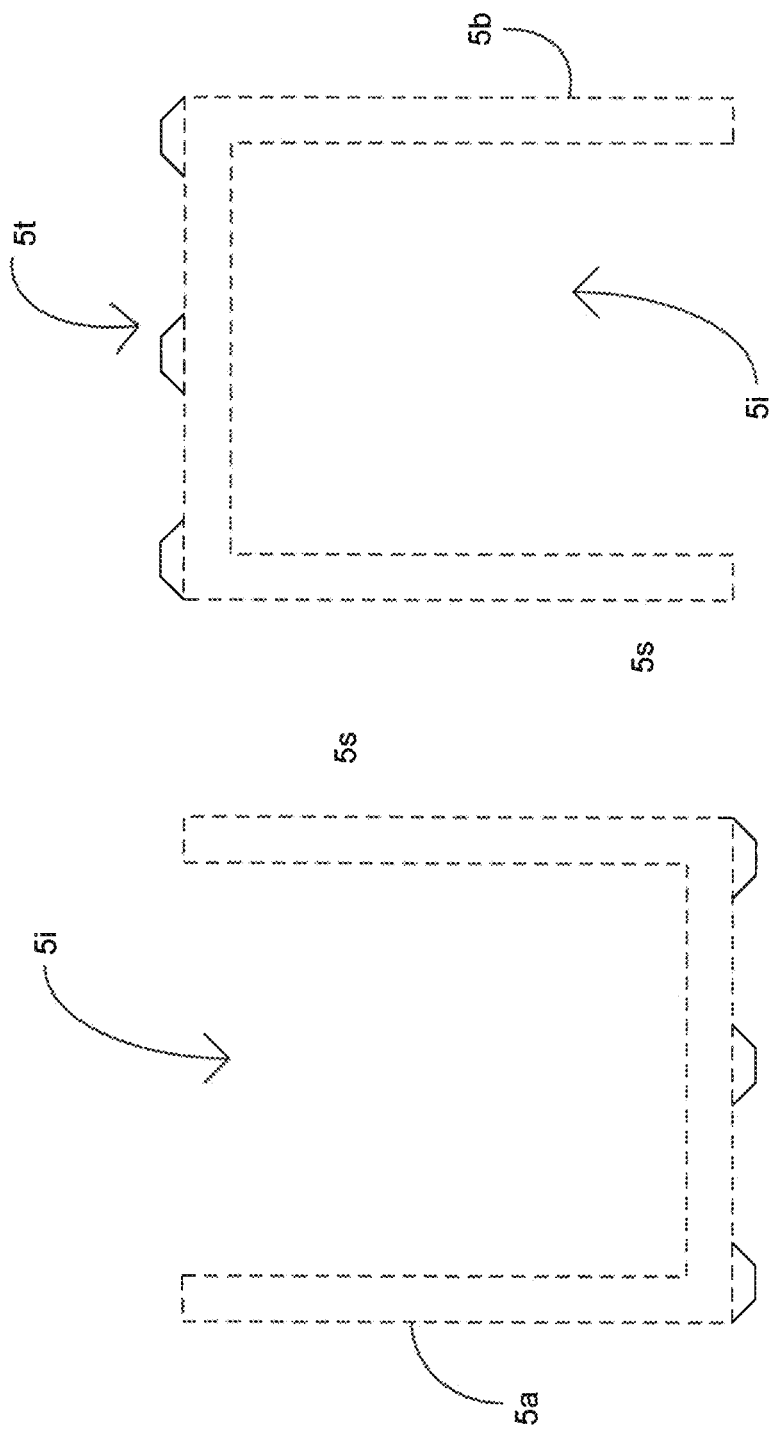
FIG. 7 includes two front views of a bin.

In an alternative embodiment of the present invention, the first predetermined position 5 of the bins corresponds to the forklift access side of the bins facing downward and the second predetermined position 5b of the bins corresponds to the forklift access side of the bins facing upward as shown in FIGS. 1a and 7.

Figure 1D:
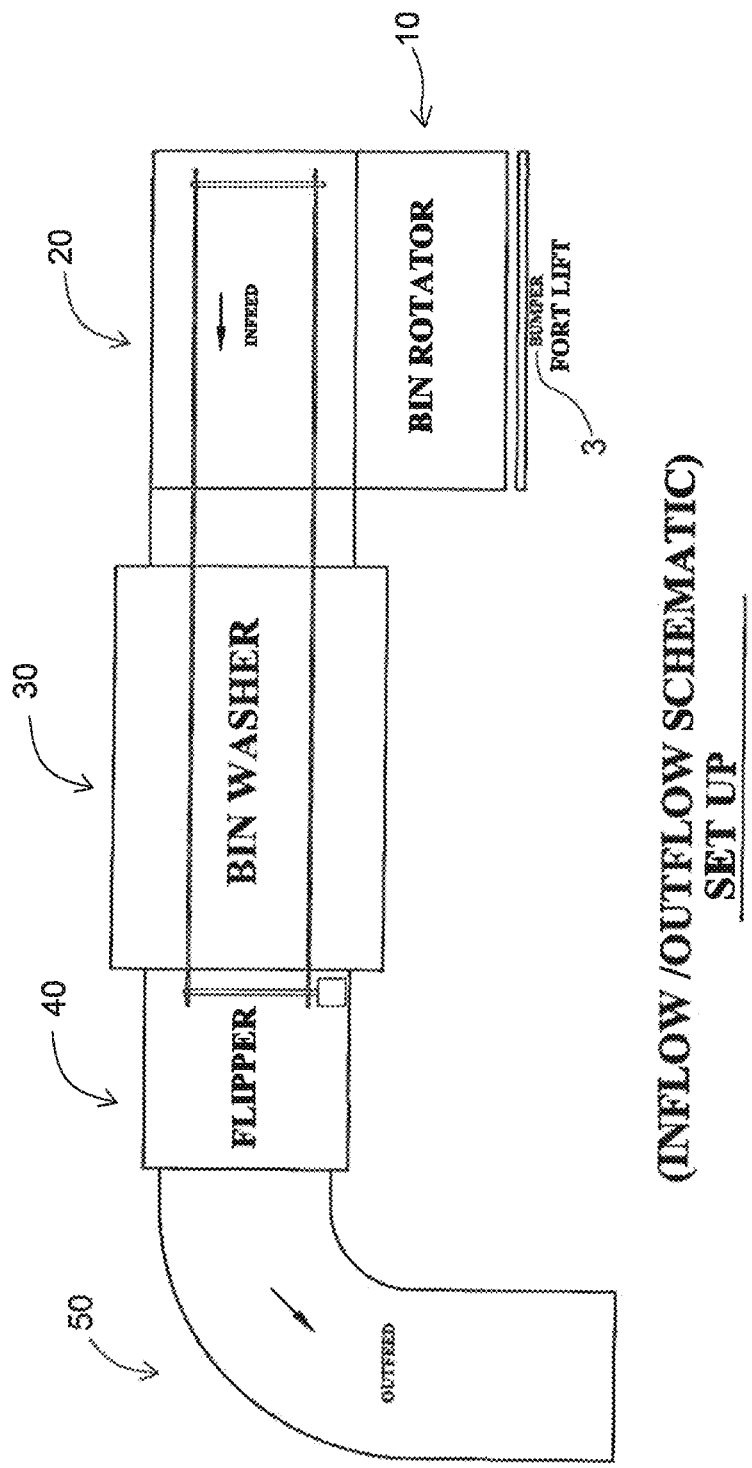
Figure 2B:
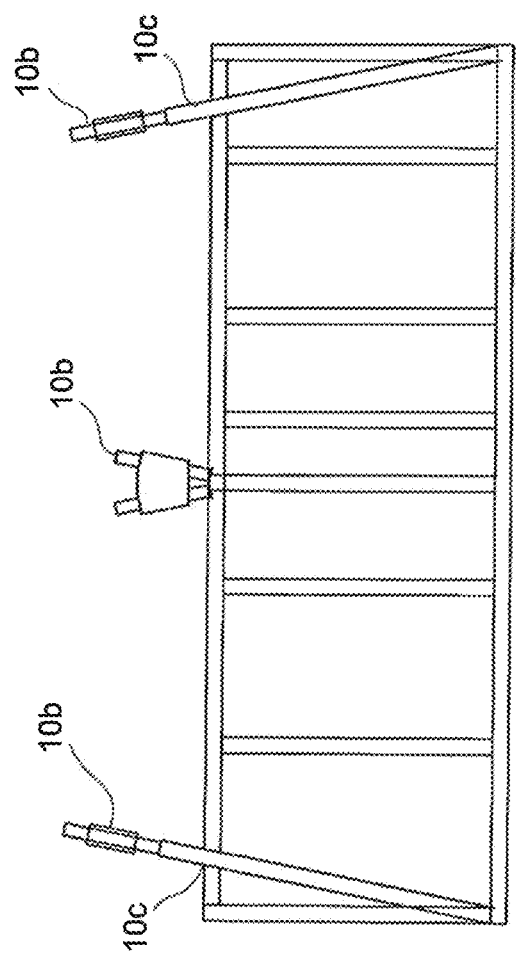
FIG. 2B is another side and front perspective view of the bin rotator zone.
Figure 2B:
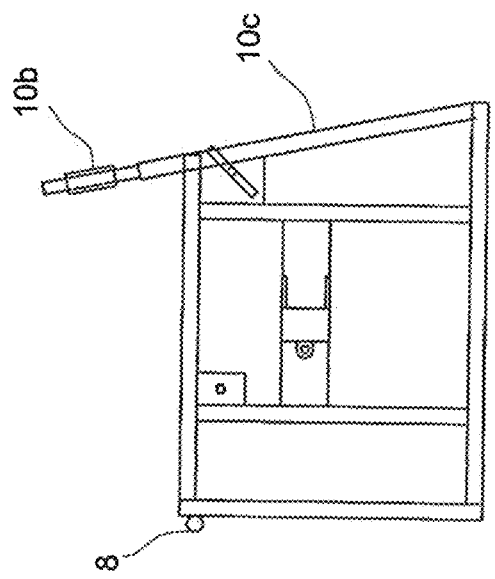
Figure 2C:
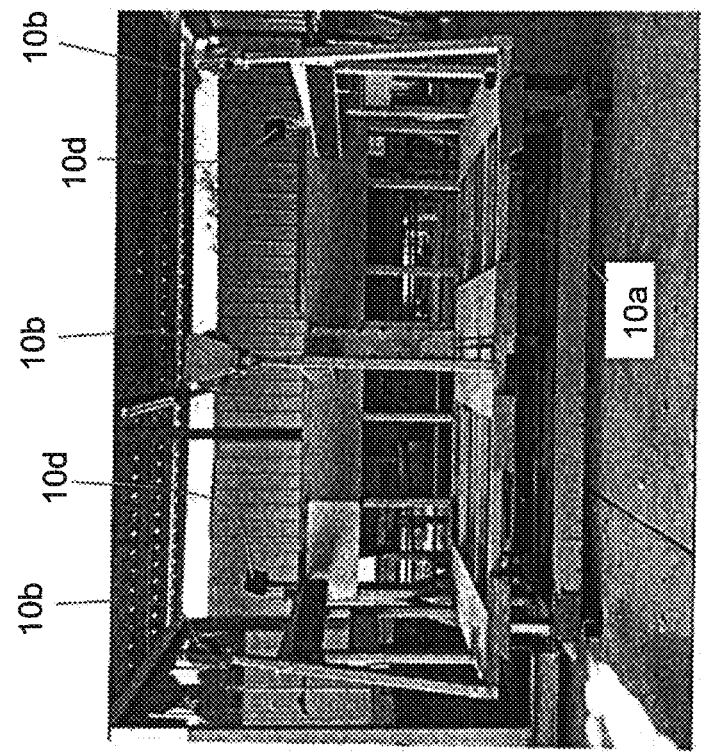
FIG. 2C is a side view and a front view of the bin rotator zone.
Figure 2C:
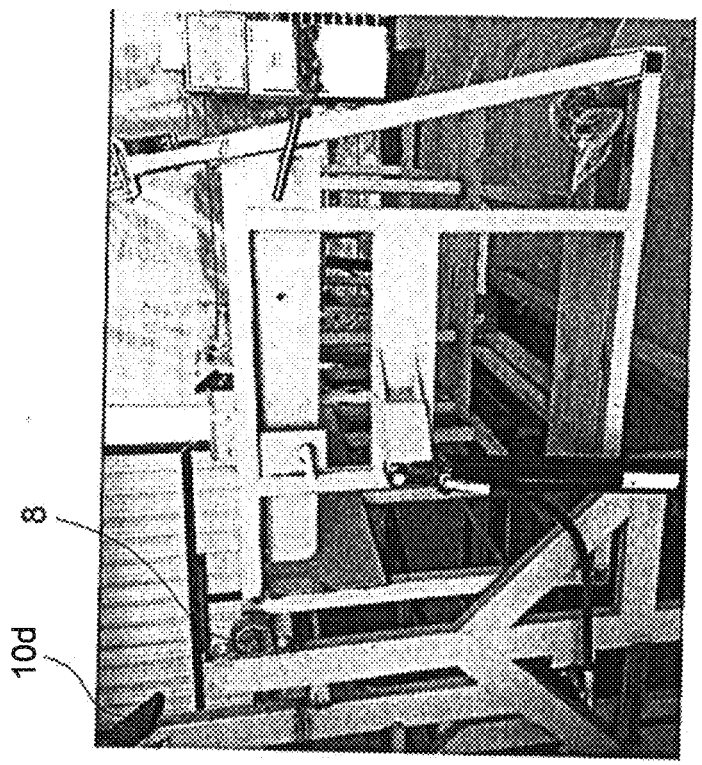
Figure 3A:
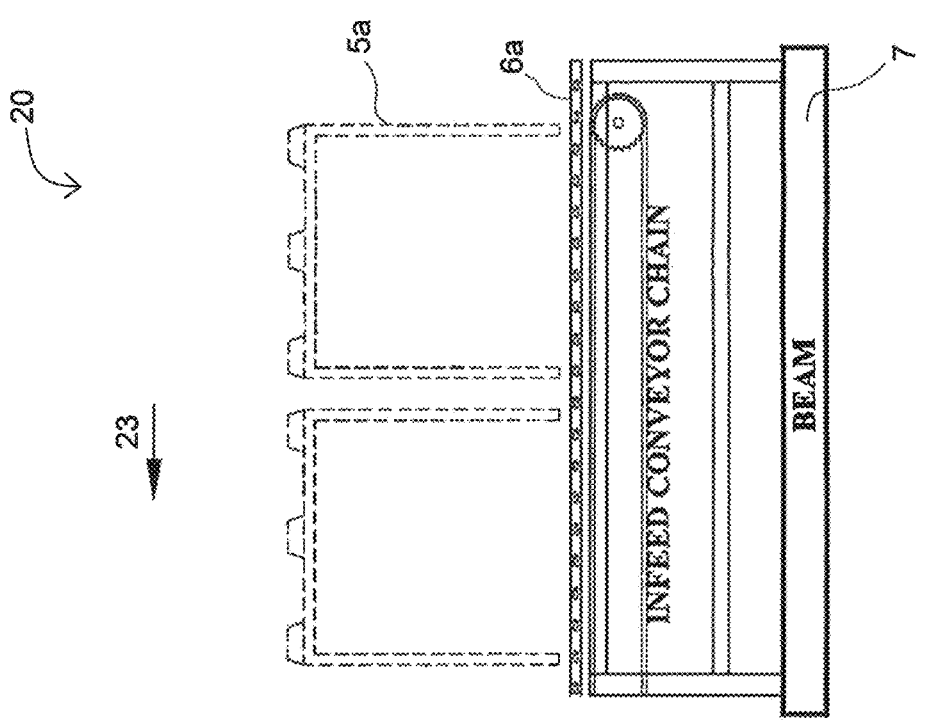
FIGS. 3A and 3B are side perspective views of the infeed zone.
Figure 3B:
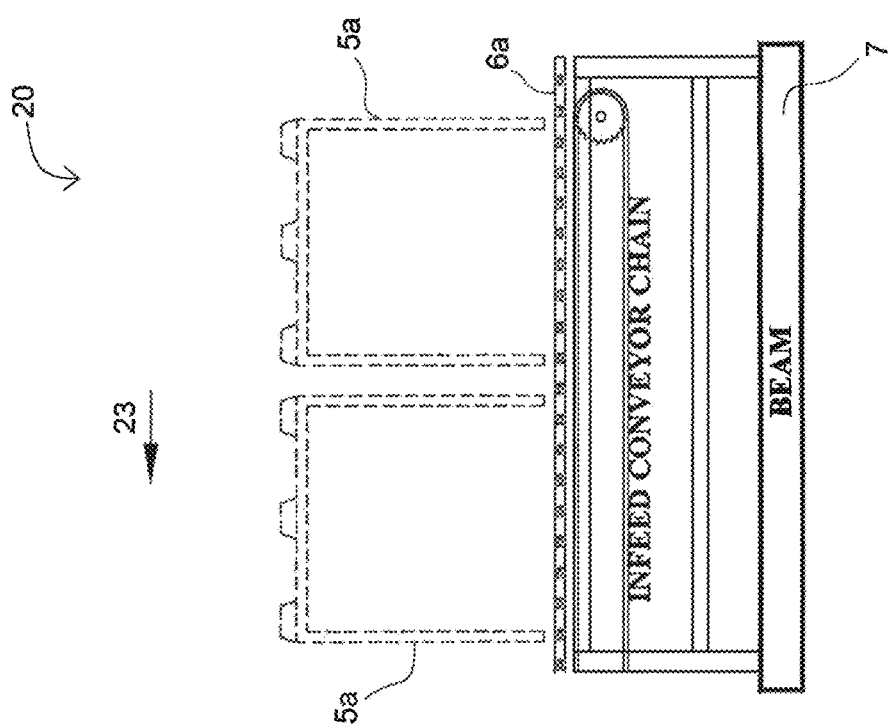

Referring now to FIGS. 2A, 2C and 2B, the bin rotator 10 includes at least one bin holder 10a for holding at least one bin at a first predetermined position 5a on at least one of the bin holders 10a. The bin rotator 10 also has a central axis of rotation 8 that allows the bin rotator 10 to rotate upward at a first predetermined angle 10r for allowing the bins to advantageously slide off the bin holder 10a via gravitational energy. The induced sliding of the bins generated by the gravitational energy allows the bins to be flipped and then loaded at a second predetermined position 5b onto a first conveyor platform 6a (See FIGS. 1A, 1B, 2A, 3A and 3B). The first conveyor platform 6a is disposed in an infeed conveyor zone 20 for transporting the bins in a conveying direction 23 as shown in FIGS. 1A, 1B, 2A, 3A and 3B. Also, the bin rotator 10 is located next to the infeed conveyor zone 20. Further, the bin rotator 10 also includes a bumper 3 as shown in FIGS. 1C and 1D.

In another embodiment of the present invention, the bin rotator 10 further includes a plurality of bin rotator arms 10c mounted at the front of said of the bin rotator 10 (See FIGS. 2A, 2B and 2C). The bin rotator 10 also has rotatable rubberized wheels 10b disposed at the ends of the arms 10e. Moreover, these rubberized wheels 10c are suitably configured to have a predetermined amount of rotational tension for allowing the bins to slowly slide off and then flip from the bin holder 10 to the first conveyor platform 6a. The bins slide slowly off the bin holder 10 because of the friction or resistance generated between one of the sides of the sliding bins and the rotatable rubberized wheels 10 that advantageously have a predetermined amount of rotational tension.

Referring now to FIG. 2C, the bin rotator 10 further includes a loading-bed stopper 10d suitably configured to stop the angle of rotation of the bin rotator 10 for allowing the bins to advantageously slide and then flip off the bin rotator 10 onto the first conveyor platform 6a via the gravitational energy.

Figure 4A:
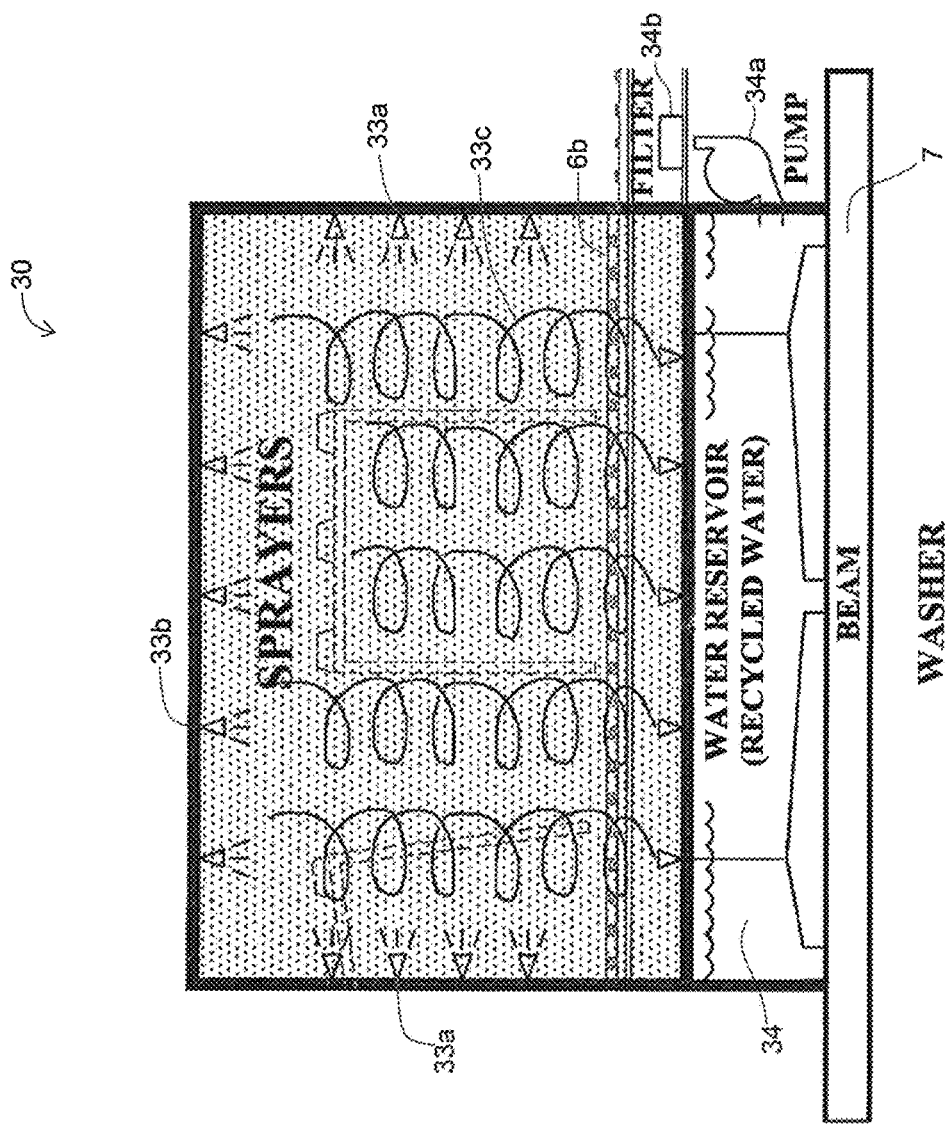
FIG. 4A is a side perspective view of the bin washer zone.
Figure 4B:
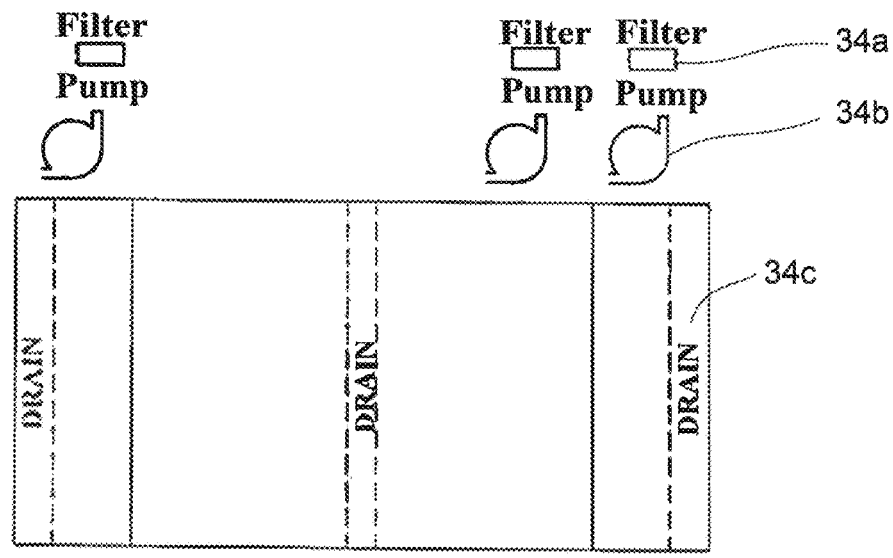
FIG. 4B is a top and side perspective view of the bin washer zone.
Figure 4B:
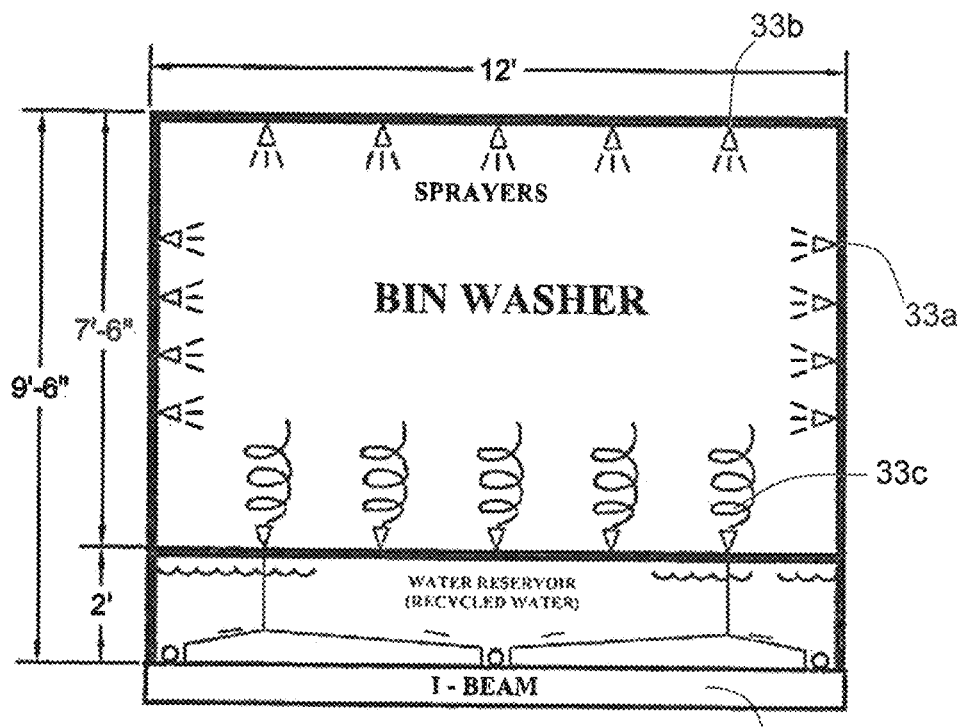

An additional embodiment of the present invention includes a bin washer zone 30 located downstream from the infeed conveyor zone 20 which includes a second conveyor platform 6b for receiving and transporting the bins disposed at the second predetermined position 5b in the conveying direction 23 (See FIGS. 1A, 1B, 4A, and 4B). The bin washer zone 30 also has a plurality of sprayers 33 for washing and sanitizing the bins with pressurized liquid as shown in FIGS. 4A and 4B. In this disclosure, pressurized liquid refers to, but is not limited to, water, a mixture of water and chlorine or a mixture of water and chlorine dioxide and/or parasitic acid or a mixture of water and a sanitizing solution.

Figure 6A:
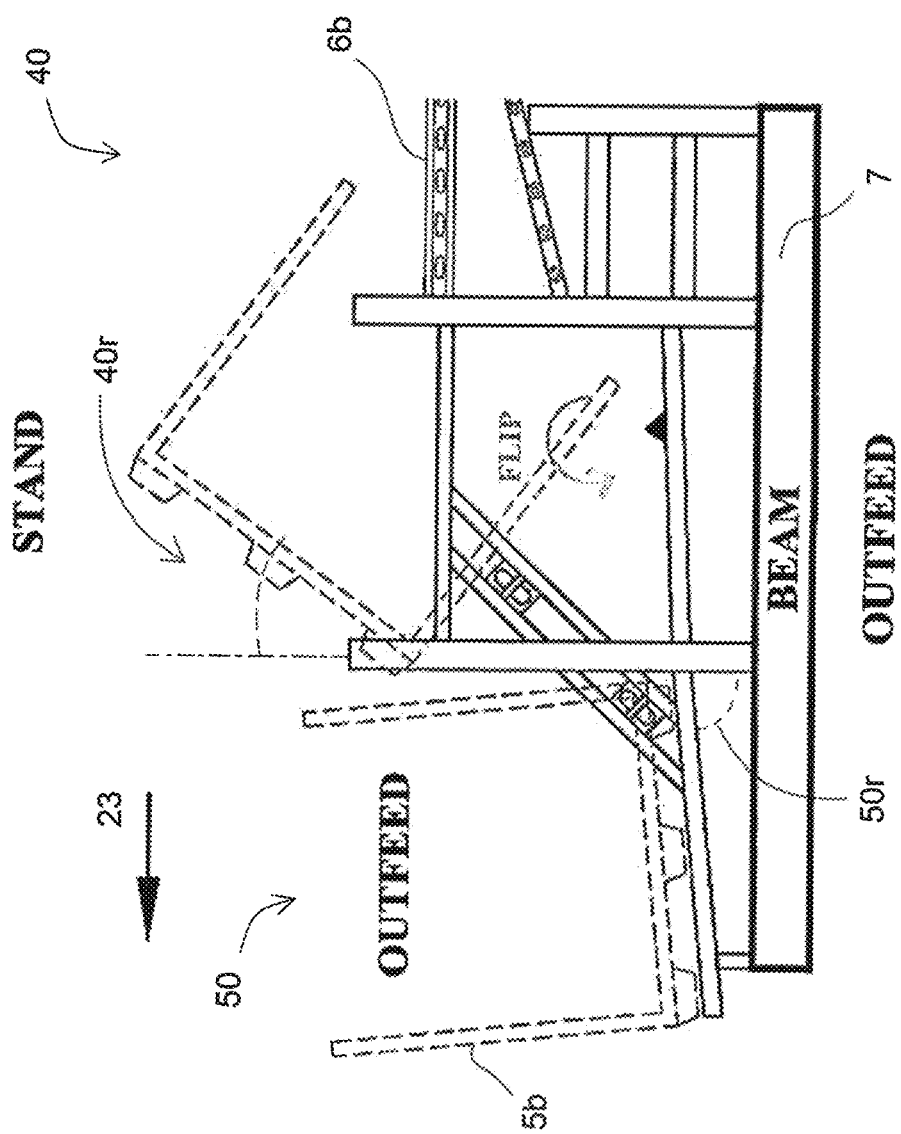
FIGS. 6A and 6B include partial side perspective views of the outfeed zone and side views of the flipping zone.
Figure 6B:
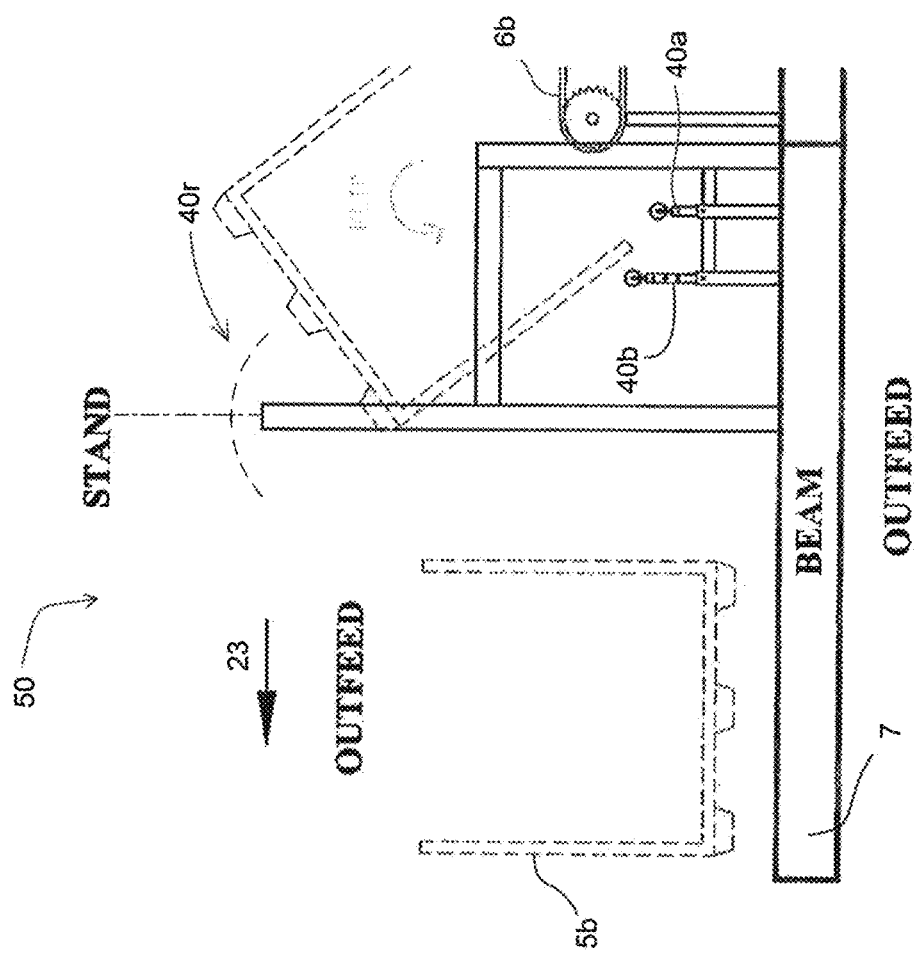

In a further embodiment of the present invention, the bin washer zone 30 is highly adaptive in that it is disposed at a predetermined vertical height directly above a bin flipping zone 40 for allowing the bins to freely descend downward via gravitational energy at a second predetermined angle 40r from the bin washer zone 30 to the bin flipping zone 40 as depicted in FIGS. 6A and 6B.

As shown in FIGS. 1A, 1B, 4A and 4B, the bin washer zone 30 further includes a liquid reservoir area 34 having at least one filter 34b for allowing the liquid to be filtered and recycled in the reservoir area 34 respectively. The reservoir area 34 also includes at least one pump 34a configured to operate in cooperation with one of the filters 34b to allow the liquid to be recycled and then pumped to the plurality of sprayers 33. The bin washer zone 30 further includes at least one drain 34 as shown in FIG. 4B for allowing the bin washer 30 to drain the liquid.

Referring still to FIGS. 1A, 1B, 4A, and 4B, the sprayers 33 are configured to spray a mixture of water and chlorine. Likewise, the sprayers 33 can be configured to spray a mixture of water and chlorine dioxide and/or a mixture of water and parasitic acid and/or a mixture of water and one or more of the following chemical compounds: chlorine, chlorine dioxide and parasitic acid. The sprayers 33 are also configured to include a metering device that allows the sprayers 33 to spray a predetermined amount of water and chlorine and/or spray a predetermined amount of water and a predetermined amount of one or more of the chemical compounds mentioned above for properly washing and sanitizing the bins in accordance with state, federal or localized rules and regulations related to food, safety and health requirements. Alternatively, the sprayers 33 include a plurality of inner top sprayers 33b, a plurality of inner right and left side sprayers 33a, and an inner middle sprayer 33c that enable the bins to be washed and sanitized with the mixture of the pressurized water and chlorine flowing from the sprayers.

Referring again to FIGS. 1A, 1B, 4A, and 4B, the inner top sprayers 33b are suitably configured to wash and sanitize the top portion 5t of the bins, the inner side sprayers 33a are configured to wash and sanitize the side portions 5s of the bins, and the inner middle sprayer 33s are configured to wash and sanitize the inner portion 5i of the bin. In a further embodiment of the present invention, the bin flipping zone 40 is disposed downstream from the bin washer zone 30 and advantageously includes a first roller-bar 40a and a second roller-bar 40b (Sec FIGS. 1A-1D, 5 and 6B). Because the bin washer zone 30 is situated at a predetermined height above the bin flipping zone 40, as the bin 10 reaches the end of bin washer zone 30, the bin 10 rotates towards the bin flipping zone 40, and descends towards the bin flipping zone 40 at an angle 40r. The first roller-bar 40a is situated relative to second roller-bar 40b such that the angle of the two roller bars and the horizon is shallower than the angle of bin 10 as it descends towards bin flipping zone 40. This configuration enables the descending bins to collide with the first roller-bar 40a and then collide with the second roller-bar 40b wherein the bin 10 pivots about first roller-bar 40a to the second roller-bar 40b, and the angular momentum of bin 10 carries the bin 10 onto an outfeed zone 50 at the first predetermined position 5a, wherein the interior of bin 10 is facing upwards (See FIGS. 1A, 1B, 5, 6A and 6B). Alternatively, the first roller-bar 40a could be configured to have a predetermined vertical height lower than the predetermined vertical height of the second roller-bar 40b as illustrated in FIGS. 5 and 6B.

Figure 5:
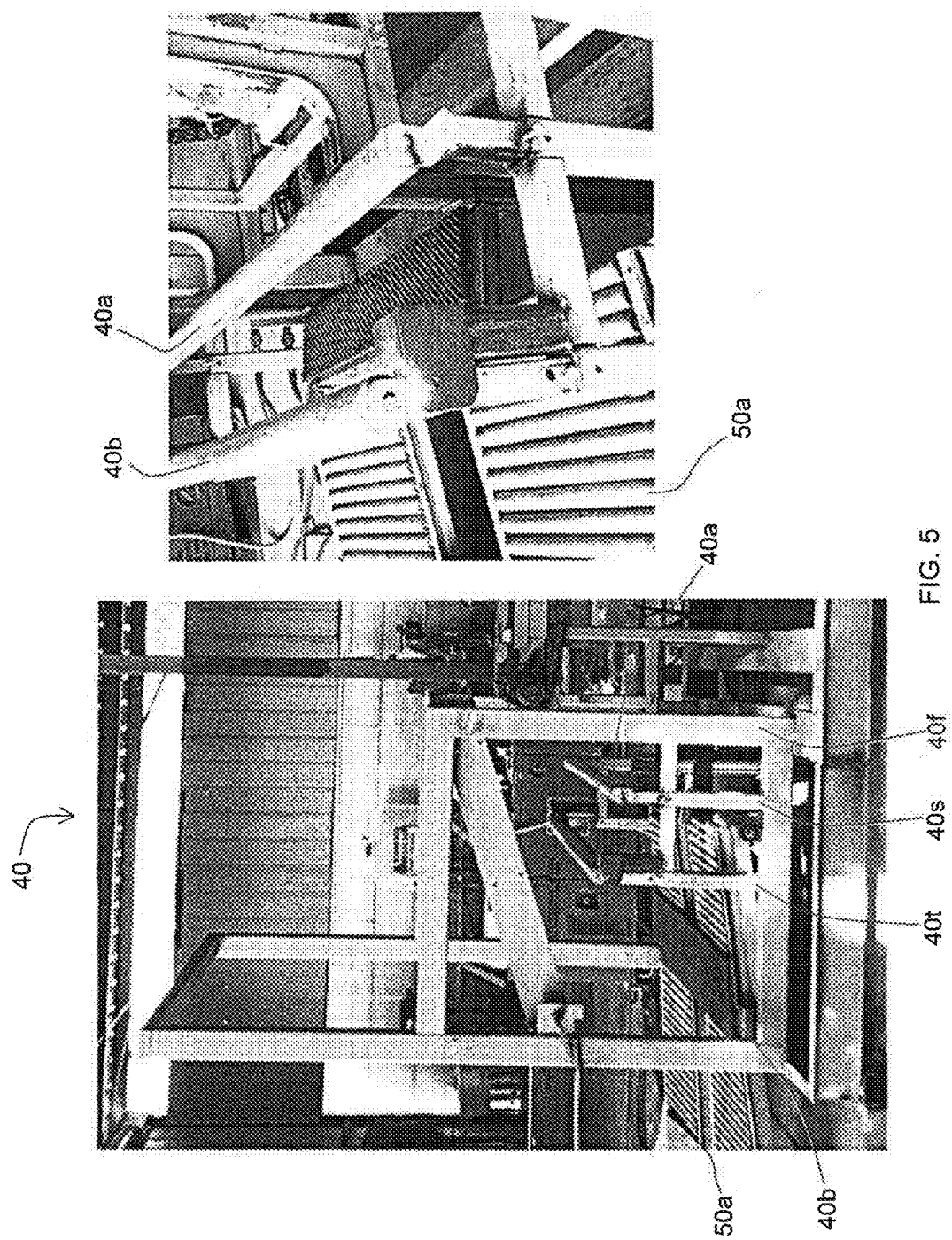
FIG. 5 includes a side perspective view of the flipping zone and a partial top perspective view of the roller-bars disposed in the flipping zone.

As depicted in FIGS. 5 and 6B, the first roller-bar 40a is attached to horizontally spaced apart right and left first roller supports 40s. The second roller-bar 40b is attached to horizontally spaced apart right and left second roller supports 40t. The first and second roller supports 40s/40t are attached vertically to a support frame 40f as shown in FIG. 5.

As depicted in FIGS. 1A-1D, 5, 6A and 6B, the outfeed zone 50 is located downstream from the bin flipping zone 40 and is defined by a plurality of rollers 50a arranged in longitudinal columns and is configured to beneficially spin via gravitational energy. In addition, the outfeed zone 50 is disposed at a third predetermined angle 50r directly above the ground to allow the bins disposed at the first predetermined position 5a to be transported via gravitational and kinetic energy in the conveying direction 23. This configuration also allows the bins to be transported into a loading position at the end of the outfeed zone 50 for reuse.

Figure 8:
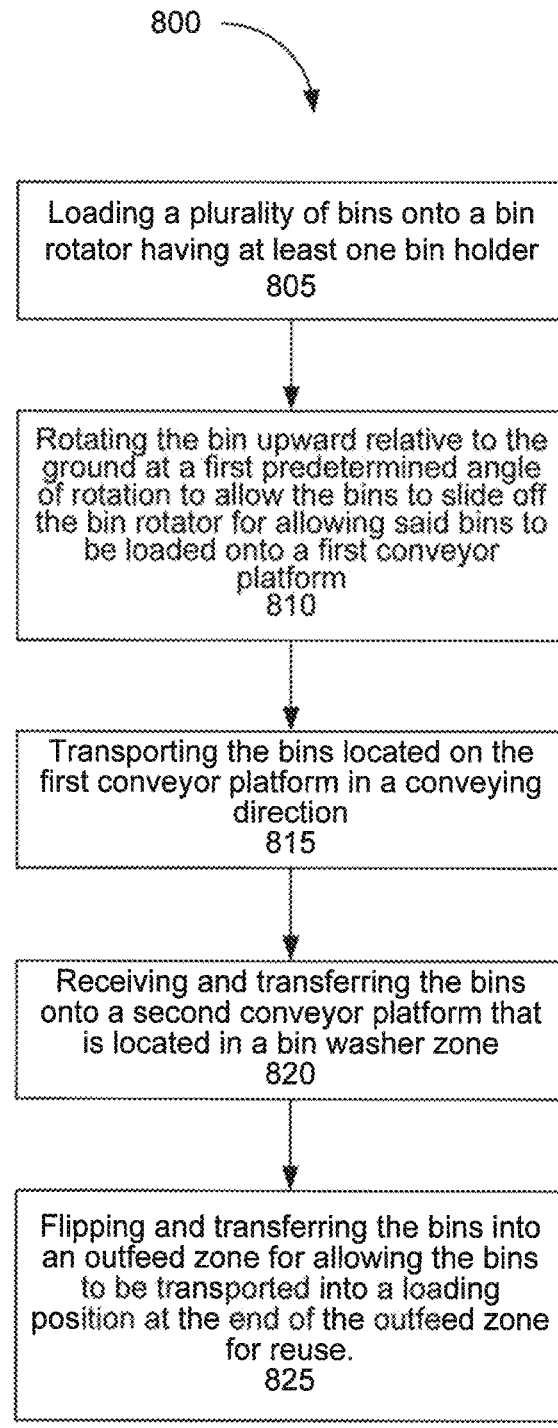
FIG. 8 represents an execution diagram for the method of washing and sanitizing bins with an automated bin washer.

FIG. 8 represents an execution diagram for the method 800 of washing and sanitizing bins with an automated bin washer 100 and an auto sanitizer 105. The method comprises the first step of 805 loading a plurality of bins onto a bin rotator 10 that has at least one bin holder 10a. The bins are loaded on the bin holder 10a at a first predetermined position 5a. The next step of the method includes 810 rotating the bin rotator 10 upward relative to the ground at a first predetermined angle of rotation 8 to allow the bins to slide and then flip off the bin rotator 10 to allow the bins to be loaded onto a first conveyor platform 6a that is disposed in an infeed conveyor zone 20. The bins are loaded onto the first conveyor platform 6a at a second predetermined position 5b as illustrated in FIG. 7.

The third step of the method is comprised of 815 transporting the bins disposed on the first conveyor platform 6a in a conveying direction 23 as illustrated in FIG. 1A. The fourth step of the method is comprised of 820 receiving and transferring the bins onto a second conveyor platform 6b in the conveying direction 23 and in the second predetermined position 5b. The second conveyor platform 6b is located in the bin washer zone 30 to allow the bins to be washed and sanitized with pressurized liquid flowing from a plurality of sprayers 33.

The fifth step of the method includes 825 flipping and transferring the bins into an outfeed zone 50 at the first predetermined position 5a therein. The outfeed zone 50 is defined by a plurality of rollers 50a arranged in longitudinal columns and configured to spin via gravitational energy. The outfeed zone 50 is also disposed at a third predetermined angle 50r directly above the ground to allow the bins to be transported via the gravitational and kinetic energy in the conveying direction 23 to allow the bins to be transported into a loading position at the end of the outfeed zone 50.

It should be understood that the foregoing relates to various embodiments and uses of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The present invention pertains to an automated bin washer which may be of value or importance to various industries such as, but not limited to the produce, farming and/or agricultural industries.

What is claimed is:

1. A method of washing and sanitizing bins, the method comprising the steps of:
   loading a plurality of bins onto a bin rotator having at least one bin holder, the bins being loaded on the bin rotator at a first predetermined upright position;
   rotating the bin rotator upward relative to the ground at a first predetermined angle of rotation to allow the bins to slide and then flip off the bin rotator for allowing said bins to be loaded onto a first conveyor platform disposed in an infeed conveyor zone, the bins being loaded on the first conveyor platform at a second predetermined inverted downward position;
   transporting the bins disposed in the second predetermined inverted downward position from the first conveyor platform in a conveying direction onto a second conveyor platform, the second conveyor platform being disposed in a bin washer zone;
   washing and sanitizing the bins disposed in the second predetermined inverted downward position in the bin washer zone with a pressurized liquid flowing from a plurality of sprayers;
   providing an outfeed zone comprised of a first and a second horizontal roller bar arranged in longitudinal columns and configured to spin via gravitational energy, the outfeed zone being disposed at a third predetermined angle directly above the ground to allow the bins to be transported via gravitational and kinetic energy in the conveying direction;
   flipping and transferring the bins into the outfeed zone by causing the bins to pivot about the first horizontal roller bar to the second horizontal roller bar such that the bins are inverted to the first predetermined upright position; and
   transporting the bins into a loading position at the end of the outfeed zone.

2. The method according to claim 1 wherein the bin washer zone includes a liquid reservoir area having at least one filter for allowing the liquid to be filtered and recycled in the reservoir area.

3. The method according to claim 1 wherein the pressurized liquid is water, wherein the first and second conveyor platforms comprise a conveyor chain and wherein the sprayers further comprise spraying a mixture of water and at least one chemical compound selected from the group consisting of chlorine, chlorine dioxide and parasitic acid.

4. The method according to claim 2 wherein the liquid reservoir area also includes at least one pump configured to function in cooperation with said at least one filter for allowing the liquid to be recycled and pumped to the plurality of sprayers.

5. The method according to claim 3, wherein said sprayers further comprise a metering device for spraying said mixture.

* * * * *

UNITED STATES PATENT AND TRADEMARK OFFICE
CERTIFICATE OF CORRECTION

| | | |
|---|---|---|
| PATENT NO. | : 10,376,935 B1 | Page 1 of 1 |
| APPLICATION NO. | : 15/699929 | |
| DATED | : August 13, 2019 | |
| INVENTOR(S) | : Jorge Cabrera | |

It is certified that error appears in the above-identified patent and that said Letters Patent is hereby corrected as shown below:

In the Specification

Column 3, Line 39; delete "miler-bar" and replace with --roller-bar--.
Column 4, Line 55; delete "5" and replace with --5a--.
Column 5, Line 21; delete "10" and replace with --10c--.

Signed and Sealed this
Nineteenth Day of November, 2019

Andrei Iancu
*Director of the United States Patent and Trademark Office*